(12) United States Patent
Krebs

(10) Patent No.: US 7,533,345 B2
(45) Date of Patent: May 12, 2009

(54) FRAMEWORK FOR MANAGING VISIBILITY OF GUI COMPONENTS

(75) Inventor: Andreas S. Krebs, Karlsruhe (DE)

(73) Assignee: SAP AG, Walldorf (DE)

( * ) Notice: Subject to any disclaimer, the term of this patent is extended or adjusted under 35 U.S.C. 154(b) by 526 days.

(21) Appl. No.: 10/826,723

(22) Filed: Apr. 16, 2004

(65) Prior Publication Data
US 2005/0235261 A1 Oct. 20, 2005

(51) Int. Cl.
G06F 3/00 (2006.01)
(52) U.S. Cl. .................... 715/745; 715/743; 715/744
(58) Field of Classification Search .............. 707/1; 715/854, 866, 744, 745, 743; 713/165
See application file for complete search history.

(56) References Cited

U.S. PATENT DOCUMENTS

| | | | |
|---|---|---|---|
| 6,476,833 B1* | 11/2002 | Moshfeghi | 715/854 |
| 7,127,679 B2* | 10/2006 | Cohen | 715/744 |
| 7,185,290 B2* | 2/2007 | Cadiz et al. | 715/838 |
| 2001/0035881 A1* | 11/2001 | Stoakley et al. | 345/772 |
| 2003/0061482 A1* | 3/2003 | Emmerichs | 713/165 |
| 2004/0133546 A1* | 7/2004 | Oni | 707/1 |

* cited by examiner

Primary Examiner—Stephen S Hong
Assistant Examiner—Omar Abdul-Ali
(74) Attorney, Agent, or Firm—Kenyon & Kenyon LLP (57) ABSTRACT

A method for managing visibility of GUI components in an application includes initializing the application and invoking a visibility manager. A user interface of the application is then displayed wherein display of the GUI components are determined by the visibility manager.

17 Claims, 10 Drawing Sheets

| MAPPING TABLE | |
|---|---|
| ID | REFERENCE TO JAVA OBJECT |
| aa<br>cc<br>.<br>.<br>.<br>. | bb<br>dd<br>.<br>.<br>.<br>. |
| 560 | 570 |

FRAMEWORK FOR MANAGING VISIBILITY OF GUI COMPONENTS

FIELD OF THE INVENTION

The present invention relates to user interfaces of computer applications and more particularly to managing GUI components embedded in the user interface.

BACKGROUND OF THE INVENTION

Graphical user interface (GUI) components include windows, frames, menus and "buttons" that provide convenient one-click access to a multitude of functions in a given software application. Example GUI components can be viewed in FIG. 1 which illustrates a prior art diagram of a typical software application user interface 10. Included in user interface 10 are pulldown menus FILE, EDIT, VIEW and HELP. Example buttons are labeled as A through G. In practice, when one of the GUI buttons is depressed, a software function is executed such as print, open file or save. Therefore, use of the buttons can save an end user the trouble of having to navigate through the pulldown menus to find the desired function.

Figure 1:
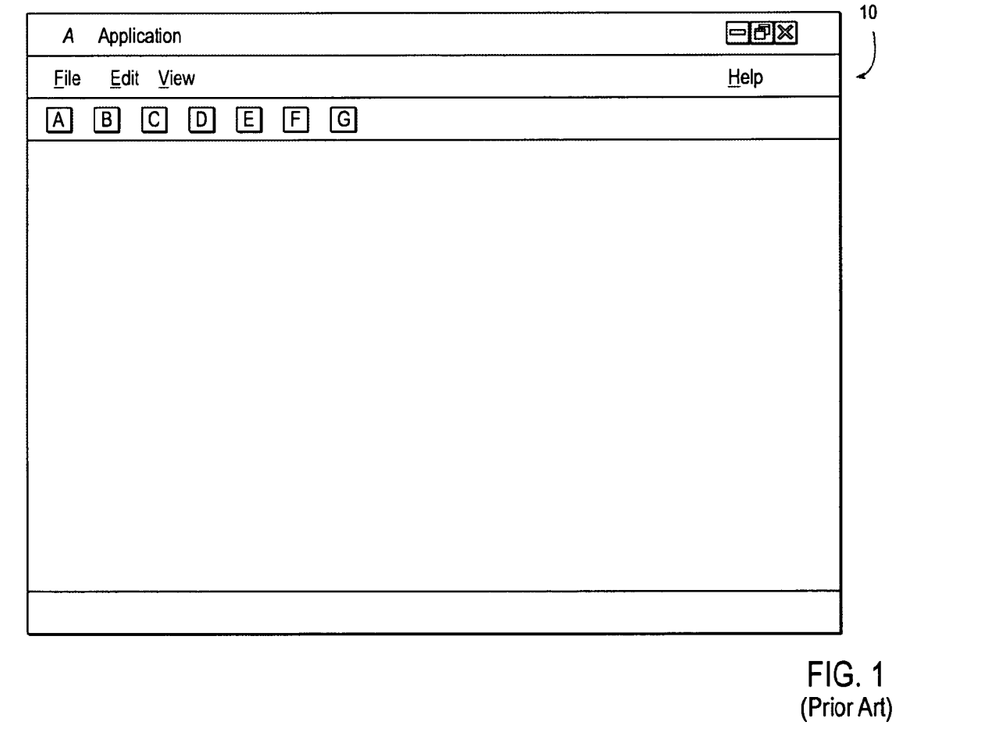
FIG. 1 illustrates a prior art diagram of a typical software application user interface.

While certainly convenient, user interface 10 suffers from a number of deficiencies. If the end user wishes to customize which components are visible, a complicated tool typically needs to be employed to hide and add components. Additionally, the end user's settings can easily be altered if the computer is shared among multiple users.

In another example, it is often desirable to define custom tool-sets for various classes of users. For example, a system administrator may need access to all functions assigned to components, a supervisor may have access to most components and a computer operator may only need access to an even smaller set. User interface 10 typically can not handle this level of customization without extensive programming tied to a login process.

In view of the foregoing, it may be useful to provide methods and systems for managing the visibility of GUI components while negating the need for additional, involved software development.

SUMMARY OF THE INVENTION

The present invention is described and illustrated in conjunction with systems, apparatuses and methods of varying scope. In addition to the aspects of the present invention described in this summary, further aspects of the invention will become apparent by reference to the drawings and by reading the detailed description that follows.

A method for managing visibility of GUI components in an application, in accordance with an embodiment of the present invention, includes initializing the application and invoking a visibility manager. A user interface of the application is then displayed wherein display of the GUI components are determined by the visibility manager.

In an alternate embodiment, the invention is a system for managing visibility of GUI components in an application. Included is a user interface of the application containing the GUI components. The system also includes a visibility manager that determines which GUI components are visible.

In still another alternate embodiment, the invention is a visibility manager data structure for use in managing visibility of GUI components in a user interface of an application. Included is a mapping table, one or more profiles and a user configuration. The visibility manager data structure is used to interact with a visibility manager, and the visibility manager is to determine which GUI components are visible in the application.

In yet another alternate embodiment, the invention is a medium embodying instructions, which, when executed by a processor, cause the processor to perform a method. The method includes initializing an application and invoking a visibility manager. A user interface of the application is then displayed wherein display of the GUI components are determined by the visibility manager.

In a further embodiment, the invention is a system for managing visibility of GUI components in an application. Included is means for interfacing with a user, with the means for interfacing including the GUI components. Also included is means for determining which GUI components are visible.

Embodiments of the invention presented are exemplary and illustrative in nature, rather than restrictive. The scope of the invention is determined by the appended claims.

DETAILED DESCRIPTION OF THE INVENTION

The present invention contemplates a variety of methods, systems and data structures for managing GUI components. In one embodiment, through the use of the Java programming language, a GUI component visibility manager controls which components are visible in a given application. This is accomplished by selecting an appropriate user profile that contains information as to what components to hide and display. In addition, other programs or facilities may provide similar opportunities for use of a visibility manager.

Figure 2:
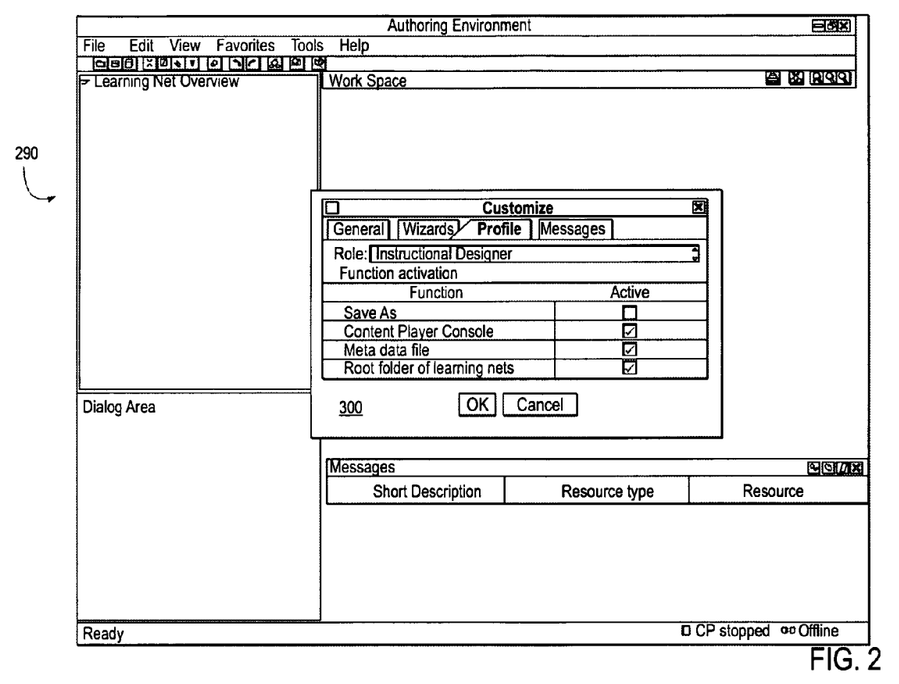
FIG. 2 illustrates an embodiment of a visibility manager interface.

The invention may be implemented in various embodiments. FIG. 2 illustrates an embodiment of a visibility manager interface 290. The visibility manager interface 290 can be used to define and modify profiles. In one embodiment, the models are stored as XML files. The profiles are utilized to define which GUI components to display in conjunction with a user configuration that will be discussed in detail subsequently. Located in interface 290 is a customization window 300 that shows an example of how a state (visible or not visible, for example), of various GUI components, can be defined. Specifically, the 'Save As' GUI component currently will not be displayed because its corresponding checkbox is blank. Conversely, the 'Content Player Console' GUI component will be displayed since its checkbox is marked. Note that the role (and the contents) of profiles and user configurations is flexible, and the specific details of this embodiment are exemplary.

Figure 3:
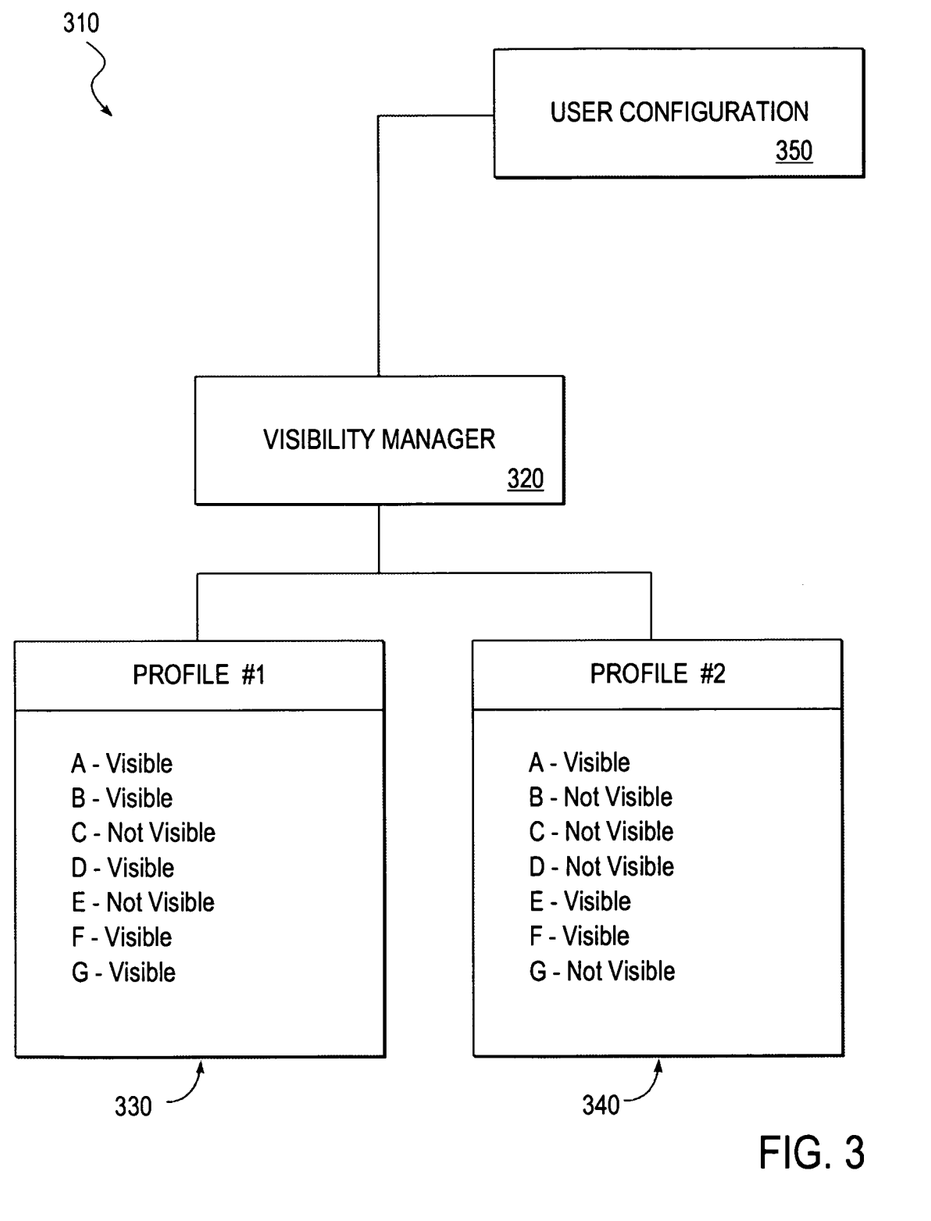
FIG. 3 is a block diagram of an embodiment of the relationship between a visibility manager, a set of profiles and a user configuration.

The visibility manager may work with a variety of data sources, for example. FIG. 3 is a block diagram 310 of an embodiment of the relationship between a visibility manager 320, a set of profiles (330 and 340) and a user configuration 350. The visibility manager 320 uses the set of profiles (330 and 340) and the user configuration 350 to determine which GUI components are displayed in a user interface of a software application. The profiles 330 and 340 store customizable information about component identifications. This information includes identification of components such that they are visible, not visible or customizable (cannot be changed). In contrast, the user configuration 350 details which profile is currently selected (if more than one profile is available). User configuration 350 also contains the visibility information for the customizable components—visible or not visible (can be changed). There are some GUI components that always need to be displayed and therefore information regarding these non-customizable components does not necessarily need to be included in the user configuration 350 and the profiles 330 and 340. Additionally, while two profiles are displayed in block diagram 310, this is merely an exemplary embodiment as any number of profiles could be employed.

Figure 4:
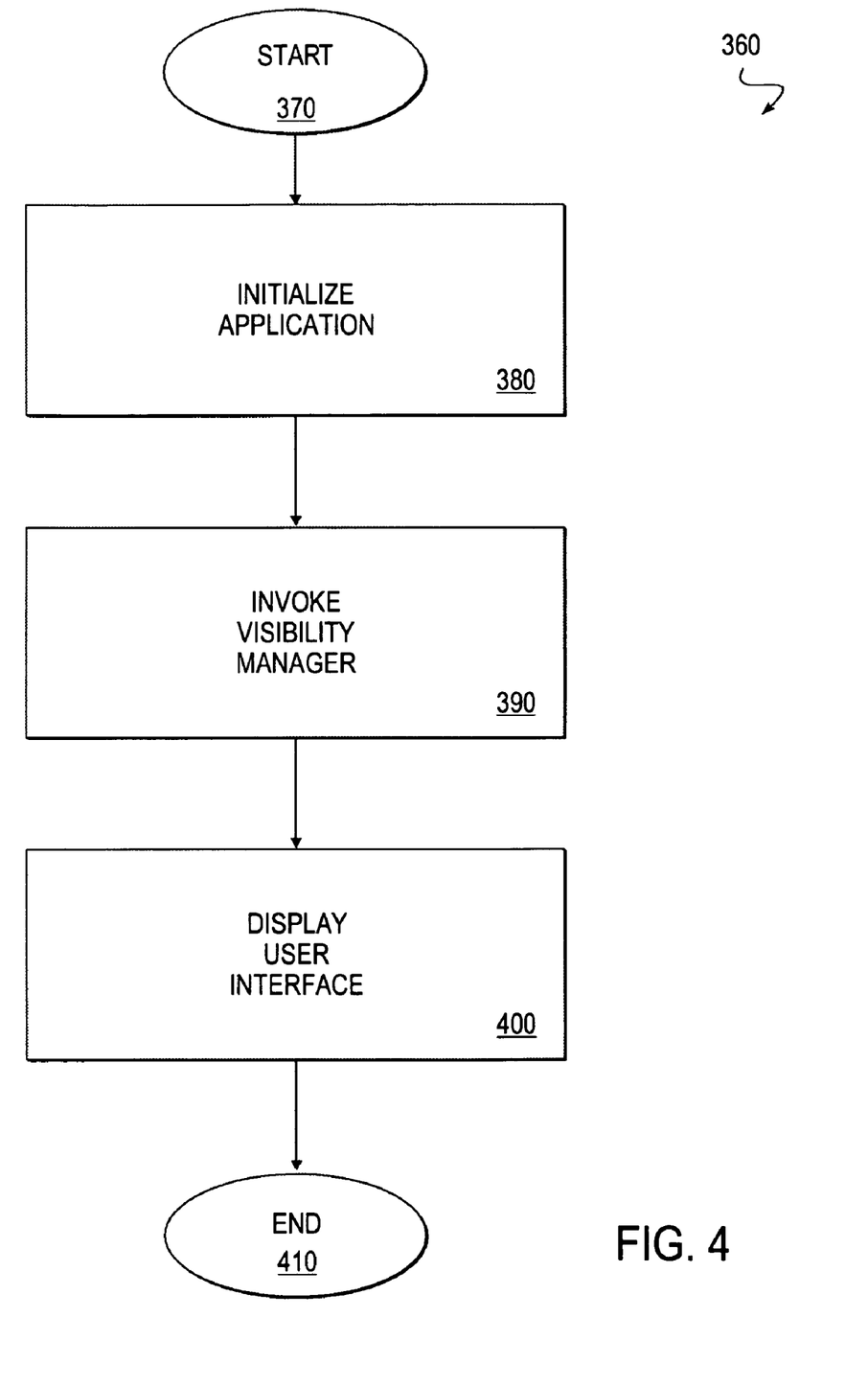
FIG. 4 is a flowchart illustrating an embodiment of a method that invokes the visibility manager.

Using the visibility manager may be accomplished by a variety of methods. FIG. 4 is a flowchart illustrating an embodiment of a method 360 that invokes the visibility manager 320 (not shown). Method 360 provides a general overview of how the embodiment functions in conjunction with a software application. Method 360 and other methods described in this document include a set of modules which may be invoked or executed in a variety of ways. For example, the modules may be executed in a parallel or serial fashion. After a start module 370, a software application is initialized or started up at module 380. After initialization, the visibility manager is invoked at module 390 wherein it is determined which GUI components are not to be displayed. The user interface of the application is then displayed, at module 400, wherein certain GUI components are not displayed, based on settings in a profile. Method 360 then ends at module 410.

Figure 5:
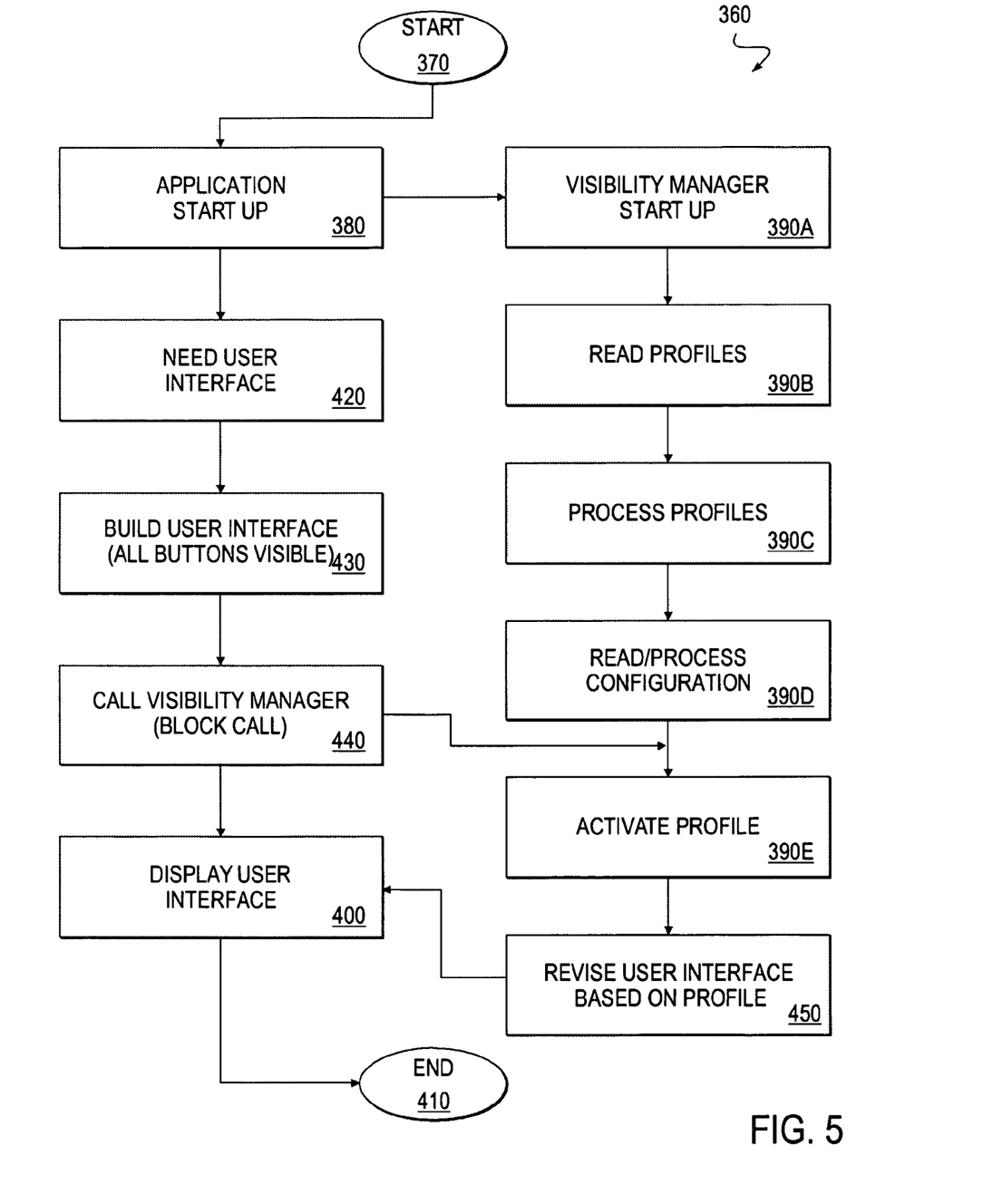
FIG. 5 is a flowchart illustrating an embodiment of the method of invoking the visibility manager in greater detail.

As may be expected, methods of using the visibility manager may include various implementation dependent details. FIG. 5 is a flowchart illustrating an embodiment of the method 360 of invoking the visibility manager 320 (not shown) in greater detail. Similarly to the process of FIG. 6, the application starts up (at module 380) after the start module 370. After startup module 380, the visibility manager 320 is then invoked in a parallel process via modules 390A, 390B, 390C, 390D and 390E. While the visibility manager 320 is being invoked, the application determines the need for a user interface at module 420 and then it is built with all GUI components visible at module 430. At module 440, the visibility manager is called to customize the user interface. The visibility manager operates after module 390E is completed.

Turning to the visibility manager 320, it first starts up at module 390A and then the profiles are read and processed via modules 390B and 390C. Here, an appropriate profile is selected, for example, based on the type of user such as a system administrator, supervisor or operator. The user configuration 350 (not shown) is then read and processed at module 390D and the appropriate profile is then activated at module 390E. The user interface is then revised based on settings in the activated profile and the user interface is displayed at modules 450 and 400 respectively. Method 360 then terminates at module 410.

Figure 6:
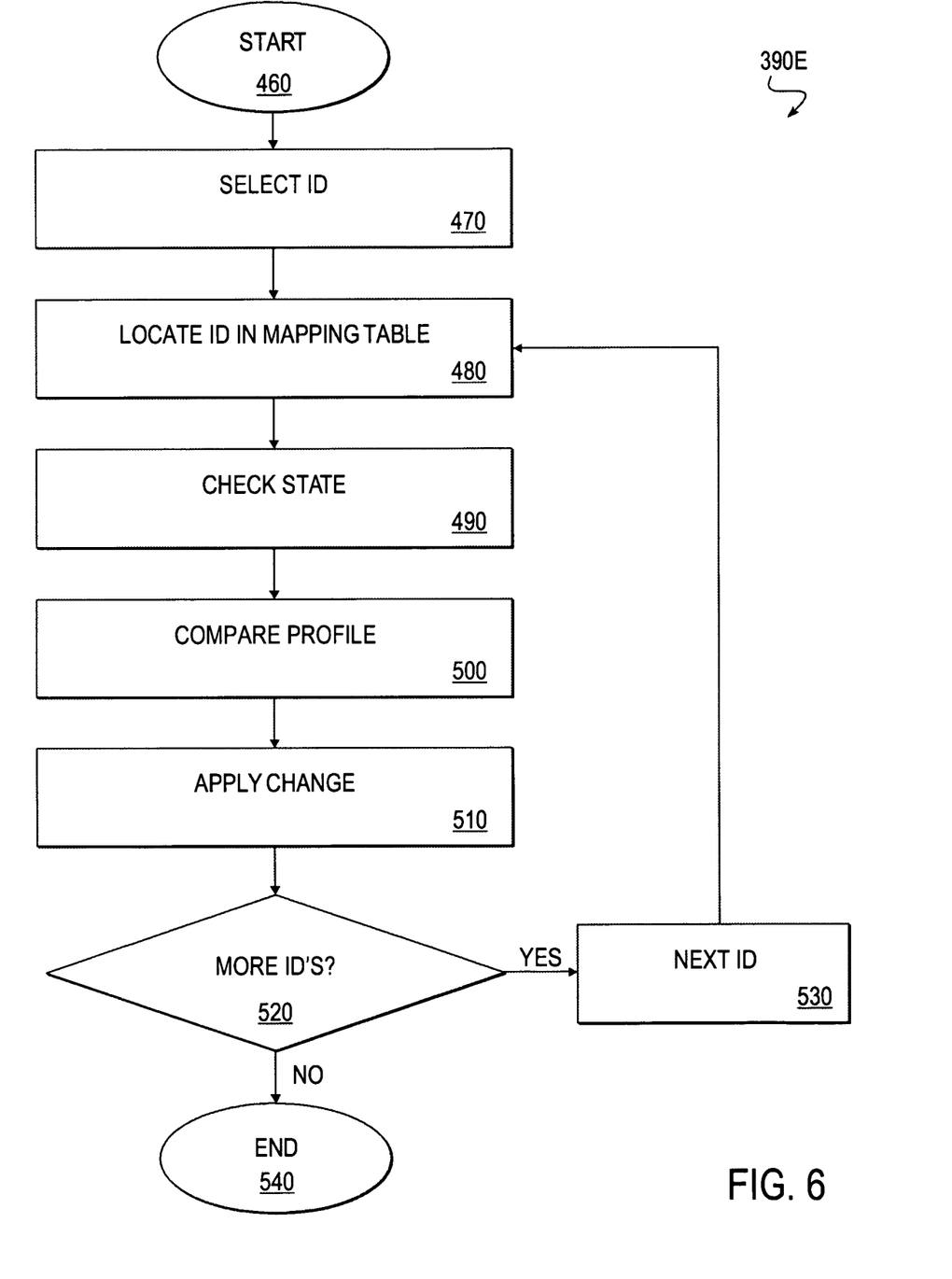
FIG. 6 is a flowchart illustrating an embodiment of a method of revising a user interface based on an activated profile.

Interactions between the visibility manager, the GUI, and other components may occur through various methods. FIG. 6 is a flowchart illustrating an embodiment of a method 450 of revising a user interface based on an activated profile. After a start module 460, an identification of a specific GUI component is selected and located in a mapping table at modules 470 and 480. The mapping table contains a listing of GUI components that correspond to a reference to a JAVA (or similar) object and will be discussed in more detail subsequently. A state (visible or not visible, for example) of the GUI component in the application is then checked against its corresponding setting in the profile at modules 490 and 500. If necessary, the visibility of the GUI component in the application is changed at module 510. If there are more GUI component identifications to process, the next one is selected via modules 520 and 530 and control passed back to module 480. If no more components need to be processed, the process ends at module 540.

Figure 7:
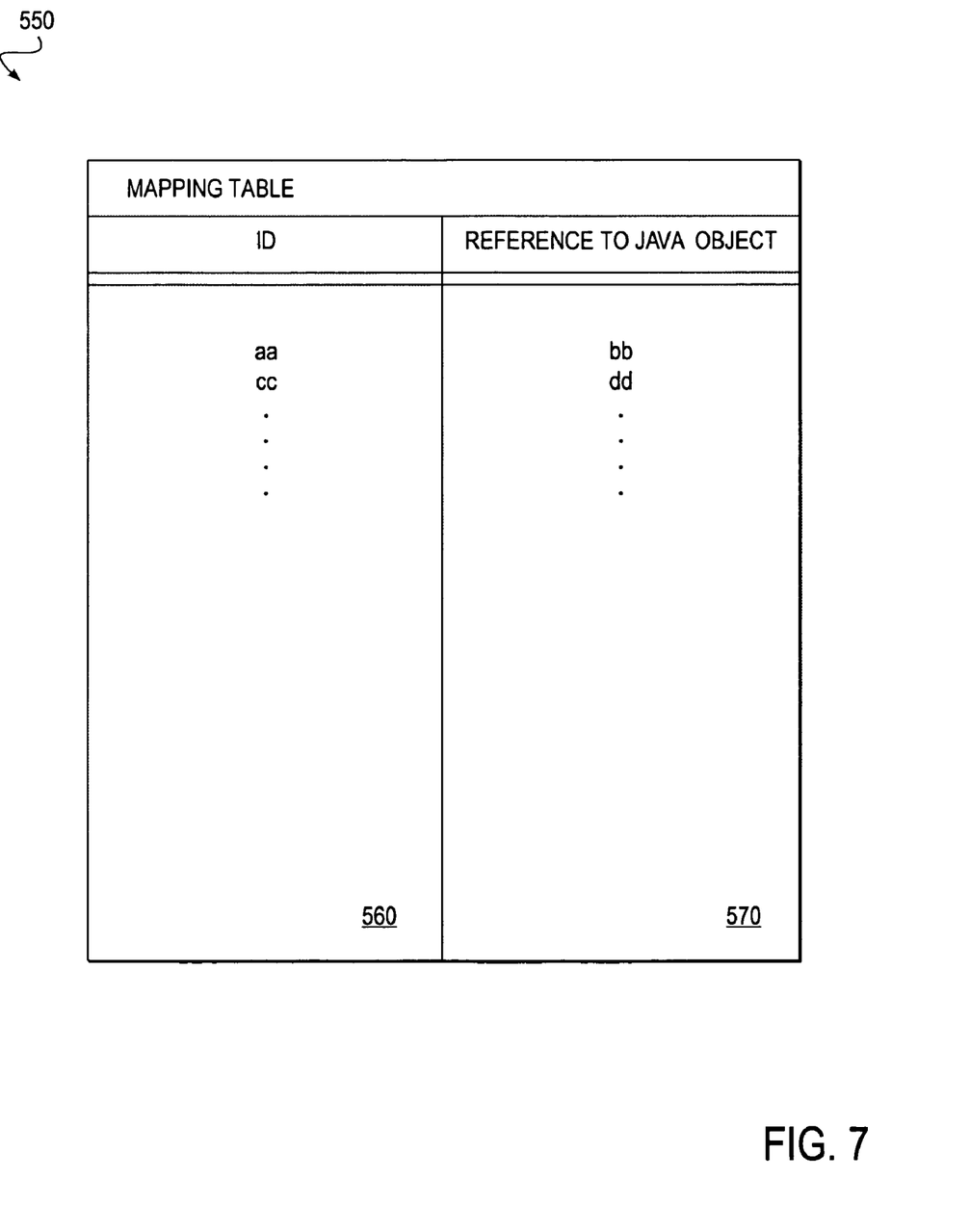
FIG. 7 is a diagram illustrating an embodiment of an exemplary mapping table.

The visibility manager may also depend on various components or data structures. FIG. 7 is a diagram illustrating an embodiment of an exemplary mapping table 550. Included in mapping table 550 is a list of identifications of GUI components 560 and corresponding references to Java objects 570. Since the Java programming language can be executed in conjunction with any type of software application, the Java objects can easily alter the GUI components in the application without the need to alter the coding of the application itself.

Figure 8:
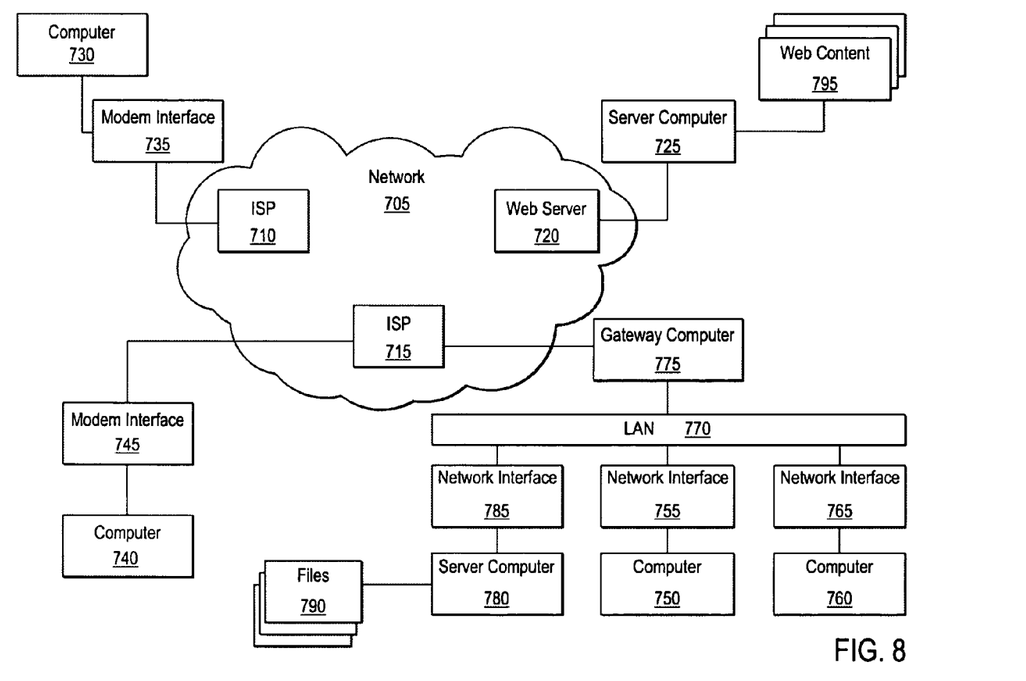
FIG. 8 is a block diagram of an embodiment of a network.
Figure 9:
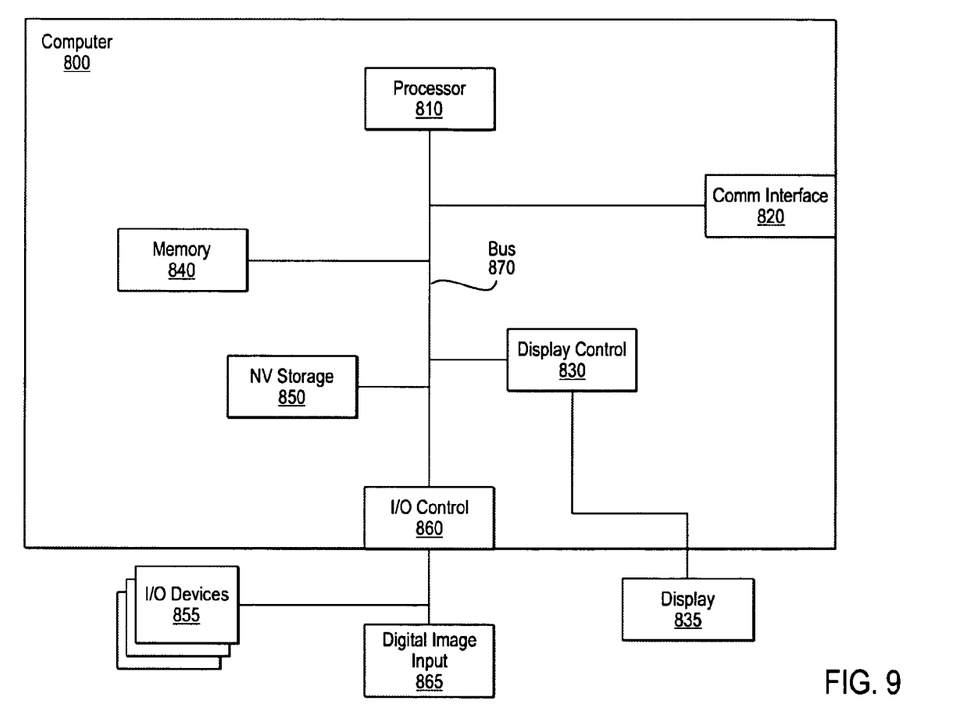
FIG. 9 is a block diagram of an embodiment of a computer.

The following description of FIGS. 8-9 is intended to provide an overview of computer hardware and other operating components suitable for performing the methods of the invention described above, but is not intended to limit the applicable environments. Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 8 is a block diagram of an embodiment of a network 705, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

Access to the Internet 705 is typically provided by Internet service providers (ISP), such as the ISPs 710 and 715. Users on client systems, such as client computer systems 730, 740, 750, and 760 obtain access to the Internet through the Internet service providers, such as ISPs 710 and 715. Access to the Internet allows users of the client computer systems to exchange information, receive and send e-mails, and view documents, such as documents which have been prepared in the HTML format. These documents are often provided by web servers, such as web server 720 which is considered to be "on" the Internet. Often these web servers are provided by the ISPs, such as ISP 710, although a computer system can be set up and connected to the Internet without that system also being an ISP.

The web server 720 is typically at least one computer system which operates as a server computer system and is configured to operate with the protocols of the World Wide Web and is coupled to the Internet. Optionally, the web server 720 can be part of an ISP which provides access to the Internet for client systems. The web server 720 is shown coupled to the server computer system 725 which itself is coupled to web content 795, which can be considered a form of a media database. While two computer systems 720 and 725 are shown in FIG. 8, the web server system 720 and the server computer system 725 can be one computer system having different software components providing the web server functionality and the server functionality provided by the server computer system 725 which will be described further below.

Client computer systems 730, 740, 750, and 760 can each, with the appropriate web browsing software, view HTML pages provided by the web server 720. The ISP 710 provides Internet connectivity to the client computer system 730 through the modem interface 735 which can be considered part of the client computer system 730. The client computer system can be a personal computer system, a network computer, a Web TV system, or other such computer system.

Similarly, the ISP 715 provides Internet connectivity for client systems 740, 750, and 760, although as shown in FIG. 8, the connections are not the same for these three computer systems. Client computer system 740 is coupled through a modem interface 745 while client computer systems 750 and 760 are part of a LAN. While FIG. 7 shows the interfaces 735 and 745 as generically as a "modem," each of these interfaces can be an analog modem, ISDN modem, cable modem, satellite transmission interface (e.g. "Direct PC"), or other interfaces for coupling a computer system to other computer systems.

Client computer systems 750 and 760 are coupled to a LAN 770 through network interfaces 755 and 765, which can be Ethernet network or other network interfaces. The LAN 770 is also coupled to a gateway computer system 775 which can provide firewall and other Internet related services for the local area network. This gateway computer system 775 is coupled to the ISP 715 to provide Internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the Internet through the gateway system 775.

FIG. 9 is a block diagram of an embodiment of a computer that can be used as a client computer system or a server computer system or as a web server system. Such a computer system can be used to perform many of the functions of an Internet service provider, such as ISP 710. The computer system 800 interfaces to external systems through the modem or network interface 820. It will be appreciated that the modem or network interface 820 can be considered to be part of the computer system 800. This interface 820 can be an analog modem, ISDN modem, cable modem, token ring interface, satellite transmission interface (e.g. "Direct PC"), or other interfaces for coupling a computer system to other computer systems.

The computer system 800 includes a processor 810, which can be a conventional microprocessor such as an Intel Pentium microprocessor or Motorola Power PC microprocessor. Memory 840 is coupled to the processor 810 by a bus 870. Memory 840 can be dynamic random access memory (DRAM) and can also include static RAM (SRAM). The bus 870 couples the processor 810 to the memory 840, also to non-volatile storage 850, to display controller 830, and to the input/output (I/O) controller 860.

The display controller 830 controls in the conventional manner a display on a display device 835 which can be a cathode ray tube (CRT) or liquid crystal display (LCD). The input/output devices 855 can include a keyboard, disk drives, printers, a scanner, and other input and output devices, including a mouse or other pointing device. The display controller 830 and the I/O controller 860 can be implemented with conventional well known technology. A digital image input device 865 can be a digital camera which is coupled to an I/O controller 860 in order to allow images from the digital camera to be input into the computer system 800.

The non-volatile storage 850 is often a magnetic hard disk, an optical disk, or another form of storage for large amounts of data. Some of this data is often written, by a direct memory access process, into memory 840 during execution of software in the computer system 800. One of skill in the art will immediately recognize that the terms "machine-readable medium" or "computer-readable medium" includes any type of storage device that is accessible by the processor 810 and also encompasses a carrier wave that encodes a data signal.

The computer system 800 is one example of many possible computer systems which have different architectures. For example, personal computers based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 840 for execution by the processor 810. A Web TV system, which is known in the art, is also considered to be a computer system according to this embodiment, but it may lack some of the features shown in FIG. 9, such as certain input or output devices. A typical computer system will usually include at least a processor, memory, and a bus coupling the memory to the processor.

In addition, the computer system 800 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the LINUX operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments also relate to apparatus for performing the operations herein. This apparatus may be specially constructed for the required purposes, or it may comprise a general purpose computer selectively activated or reconfigured by a computer program stored in the computer. Such a computer program may be stored (embodied) in a computer (machine) readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 10:
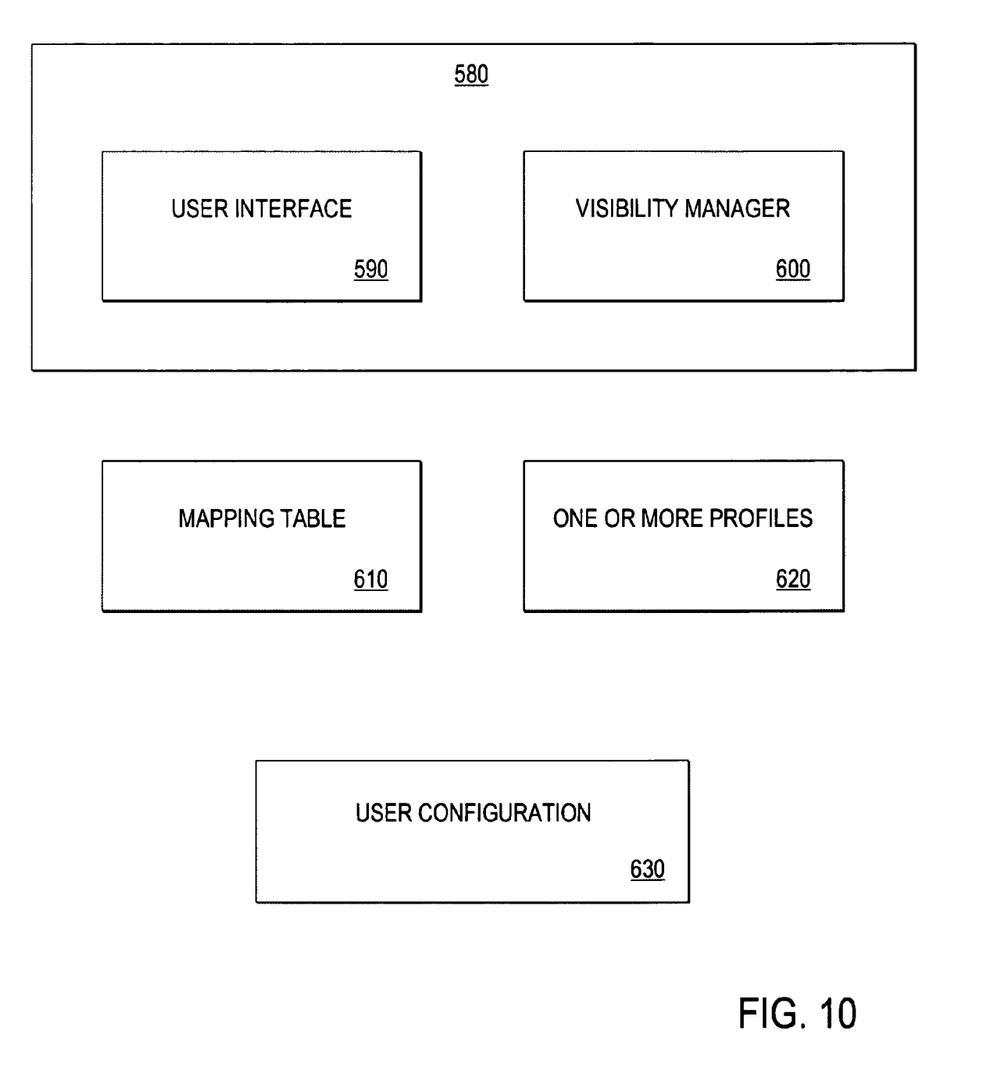
FIG. 10 illustrates an embodiment of a medium embodying instructions for causing a processor to execute the modules of operating a process.

The visibility manager may be embodied as part of a machine readable medium. FIG. 10 illustrates an embodiment of a medium 580 embodying instructions for causing a processor to execute the modules of operating a process. A medium may be a single piece of media or a collection of media, without materially changing the medium. This medium is machine-readable, allowing an associated processor to execute instructions embodied therein.

Medium 580 includes a user interface 590, a visibility manager 600, a mapping table 610, one or more profiles 620 and a user configuration 630. User interface 590 displays the various GUI components in an application and can be modified by the visibility manager 600. Visibility manager accomplishes this by selecting an appropriate profile from the one or more profiles 620 in conjunction with the user configuration 630. The visibility manager 600 uses the one or more profiles 620 and the user configuration 630 to determine which GUI components are displayed in a user interface 590 of a software application. The one or more profiles 620 store customizable information about component identifications. This information includes identification of components such that they are visible, not visible or customizable (cannot be changed). In contrast, the user configuration 630 details which profile is currently selected (if more than one profile is available). User configuration 630 also contains the visibility information for the customizable components—visible or not visible (can be changed). The mapping table 610 is then utilized to locate Java objects to assist in displaying or hiding of GUI components in the user interface 590.

This invention potentially allows the user interface of an application to be easily modified for a variety of different users without the inefficient process of re-coding the application. As a result, access levels to a variety of application functions can easily be defined and managed dynamically by appropriate personnel.

While this invention has been described in terms of certain embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention.

What is claimed is:

1. A method of managing visibility of GUI components in an application comprising:
   providing a user interface of a visibility manager for selection, for each of a plurality of profiles, of one of a plurality of visibility states for each of at least a subset of the GUI components; and
   for displaying a user interface screen of the application according to an applied one of the plurality of profiles:
   initializing the application, wherein the initializing includes:
      starting the application; and
      building the user interface screen of the application with all of the GUI components set as visible;
   invoking the visibility manager to:
      determine, based on the selected visibility states of the applied profile, which of the GUI components of the built user interface screen are to be set as not visible; and
      prior to any display of the built user interface screen, revise the built user interface screen based on the determination; and
   displaying the revised user interface screen of the application;
   wherein the invoking the visibility manager is by:
   reading the plurality of profiles,
      processing the plurality of profiles,
      reading and processing a user configuration based on the plurality of profiles, and
      activating the applied profile by:
      selecting an identification of a particular GUI component,
      locating the identification in a mapping table,
      checking a state of the particular GUI component,
      comparing the state to the applied profile,
      changing the state if not in agreement with the applied profile, and repeating locating the identification, checking the state of the particular GUI component, comparing the state and changing the state for any remaining additional identifications of additional GUI components.

2. The method as recited in claim 1 wherein the state is visible or not visible.

3. The method as recited in claim 1 wherein the mapping table comprises a plurality of identifications of GUI components and a corresponding plurality of references to objects of an object-oriented and platform independent programming language.

4. A system for managing visibility of GUI components in an application comprising:
    a processor configured to provide:
        a user interface module of the application;
        a visibility manager; and
        a user interface of the visibility manager via which to receive, for one or more profiles, input of respective selections of visibility states of at least a subset of the GUI components;
    wherein:
        for display of a single user interface screen of the application according to an applied one of the profiles:
            the user interface module of the application is configured to initially build the user interface screen with all of the GUT components set as visible and subsequently call the visibility manager;
            the visibility manager is configured to be invoked to, in response to the call:
    determine, based on the selected visibility states of the at least a subset of the GUI components, which of the GUI components of the built user interface screen are to be set as not visible;
    revise the built user interface screen based on the determination, the built user interface screen not being displayed prior to the revision; and
    provide the revised user interface screen to the user interface module; and
        the user interface module is configured to display the revised user interface screen; and
        the invocation of the visibility manager includes invoking the visibility manager to:
            read the plurality of profiles,
            process the plurality of profiles,
            read and processing a user configuration based on the plurality of profiles, and
            activate the applied profile by:
    selecting an identification of a particular GUI component,
    locating the identification in a mapping table,
    checking a state of the particular GUI component,
    comparing the state to the applied profile,
    changing the state if not in agreement with the applied profile, and
    repeating locating the identification, checking the state of the particular GUI component, comparing the state and changing the state for any remaining additional identifications of additional GUI components.

5. The system as recited in claim 4 wherein the state is visible or not visible.

6. The system as recited in claim 4 wherein the mapping table comprises a plurality of identifications of GUI components and a corresponding plurality of references to objects of an object-oriented and platform independent programming language.

7. A system comprising:
    a processor configured to:
        use a visibility manager data structure in managing visibility of GUI components in a single user interface screen of an application, the visibility manager data structure comprising a mapping table, one or more profiles and a user configuration identifying which of the one or more profiles is to be applied;
        provide a user interface of a visibility manager via which to receive for the one or more profiles input of respective selections of visibility states of at least a subset of the GUI components; and
        display the user interface screen of the application according to an applied one of the profiles using the application and the visibility manager, the displaying of the user interface screen including:
            the application building the user interface screen of the application with all of the GUI components set as visible and subsequently calling the visibility manager;
            the visibility manager, responsive to the calling, being invoked to:
                determining, based on the selected visibility states of the applied profile, which of the GUI components of the built interface screen are to be set as not visible; and
                prior to any display of the built user interface screen, revising the built user interface screen based on the determination; and
        the application displaying the revised user interface screen of the application;
        wherein the invocation of the visibility manager includes invoking the visibility manager to:
            read the one or more profiles profiles upon initialization of the application,
            process the plurality of profiles,
            read and processing a user configuration based on the plurality of profiles, and
        activate the applied profile by:
            selecting an identification of a particular GUI component,
            locating the identification in a mapping table,
            checking a state of the particular GUI component,
            comparing the state to the applied profile,
            changing the state if not in agreement with the applied profile, and
            repeating locating the identification, checking the state of the particular GUI component, comparing the state and changing the state for any remaining additional identifications of additional GUI components.

8. The system as recited in claim 7 wherein the state is visible or not visible.

9. The system as recited in claim 7 wherein the mapping table comprises a plurality of identifications of GUI components and a corresponding plurality of references to objects of an object-oriented and platform independent programming language.

10. A hardware-implemented computer-readable medium embodying instructions, which, when executed by a processor, cause the processor to perform a method, the method comprising:
    providing a user interface of a visibility manager via which to receive, for one or more profiles, input of respective selections of visibility states of at least a subset of GUI components; and for displaying a user interface screen of the application according to an applied one of the plurality of profiles:
  initializing an application, wherein the initializing includes:
    starting the application; and
    building the user interface screen of the application with all of the GUI components set as visible;
  invoking a visibility manager to:
    determine, based on the selected visibility states of the applied profile, which of the GUI components of the built user interface screen are to be set as not visible; and
    prior to any display of the built user interface screen, revise the built user interface screen based on the determination; and
  displaying the revised user interface screen of the application;
  wherein the invoking the visibility manager is by:
    reading the one or more profiles,
    processing the one or more profiles,
    reading and processing a user configuration based on the one or more profiles, and
    activating a particular profile of the one or more profiles by:
      selecting an identification of a particular GUI component,
      locating the identification in a mapping table,
      checking a state of the particular GUI component,
      changing the state if not in agreement with the particular profile of the one or more profiles, and
      repeating locating the identification, checking the state of the particular GUI component, comparing the state and changing the state for any remaining additional identifications of additional GUI components.

11. The medium as recited in claim 10 wherein the state is visible or not visible.

12. The medium as recited in claim 10 wherein the mapping table comprises a plurality of identifications of GUI components and a corresponding plurality of references to objects of an object-oriented and platform independent programming language.

13. A system for managing visibility of GUI components in an application, the system implemented via hardware components including a processor, comprising:
  first means for interfacing with a user, the means for interfacing providing the GUI components for display; and
  means for determining which GUI components are visible, the means for determining including second means for interfacing with a user, the second means for interfacing providing for receipt, for one or more profiles, of respective user selections of visibility states of at least a subset of the GUI components;
  wherein:
    for display of a user interface screen of the application according to an applied one of the profiles:
      the first means for interfacing is configured to initially build the user interface with all of the GUI components set as visible and subsequently call the means for determining;
      the means for determining is configured to, in response to the call:
        determine, based on the selected visibility states of the at least a subset of the GUI components, which of the GUI components of the built user interface screen are to be set as not visible;
        prior to any display of the built user interface screen, revise the built user interface screen based on the determination; and
        provide the revised user interface screen to the user interface module; and
      the first means is configured to display the revised user interface screen; and
    the means for determining includes:
      means for reading the one or more profiles upon initialization of the application:
      means for processing the one or more profiles;
      means for reading and processing a user configuration based on the one or more profiles; and
      means for activating a particular profile of the one or more profiles by;
        selecting an identification of a particular GUI component,
        locating the identification in a mapping table,
        checking a state of the particular GUI component,
        changing the state if not in agreement with the particular profile of the one or more profiles, and
        repeating locating the identification, checking the state of the particular GUI component, comparing the state and changing the state for any remaining additional identifications of additional GUI components.

14. A method for displaying a user interface, comprising:
  starting up a visibility manager;
  an application building a data structure representing a user interface including a plurality of interface components;
  during the building of the data structure and responsive to the start-up of the visibility manager, the visibility manager selecting one of a plurality of interface profiles, each of the interface profiles indicating for each of a plurality of interface components a respective visibility instruction;
  subsequent to the building of the data structure, the application calling the visibility manager;
  responsive to the call and prior to any display of the user interface, the visibility manager modifying the data structure in accordance with the visibility instructions of the selected interface profile, the modified data structure representing a modified version of the user interface which docs not include all of the plurality of interface components; and
  the application displaying the modified version of the user interface;
  wherein the modifying of the data structure by the visibility manager includes:
    reading the plurality of interface profiles upon initialization of the application,
    processing the plurality of interface profiles,
    reading and processing a user configuration based on the plurality of interface profiles, and
  activating the selected interface profile by:
    selecting an identification of a particular GUI component,
    locating the identification in a mapping table,
    checking a state of the particular GUI component,
    comparing the state to the selected interface profile,
    changing the state if not in agreement with the selected interface profile, and
    repeating locating the identification, checking the state of the particular GUI component, comparing the state and changing the state for any remaining additional identifications of additional GUI components.

15. The method of claim 14, wherein the starting up of the visibility manager and the building of the data structure by the application are performed in response to a start-up of the application.

16. The method of claim 14, wherein the selection of the selected interface profile is based on a user type associated with a present use of the application.

17. The method of claim 14, wherein the selection of the selected interface profile is based on a user configuration file which identifies which of the plurality of interface profiles a user associated with a present use of the application has set as active.

* * * * *